United States Patent [19]
Arcella et al.

[11] Patent Number: 5,585,449
[45] Date of Patent: Dec. 17, 1996

[54] FLUOROELASTOMERS COMPRISING MONOMERIC UNITS DERIVING FROM A BIS-OLEFIN

[75] Inventors: Vincenzo Arcella, Novara; Giulio Brinati, Milan; Margherita Albano, Milan; Vito Tortelli, Milan, all of Italy

[73] Assignee: Ausimont S.p.A., Milan, Italy

[21] Appl. No.: 361,663

[22] Filed: Dec. 22, 1994

[30] Foreign Application Priority Data

Dec. 29, 1993 [IT] Italy ............... MI93A2750

[51] Int. Cl.⁶ ........................ C08F 16/24
[52] U.S. Cl. ............. 526/247; 526/249; 526/252
[58] Field of Search ............... 526/247, 249, 526/252

[56] References Cited

U.S. PATENT DOCUMENTS

| | | | |
|---|---|---|---|
| 3,235,537 | 2/1966 | Albin et al. | |
| 3,752,787 | 8/1973 | de Brunner | 260/41 |
| 3,810,874 | 5/1974 | Mitsch et al. | 260/75 |
| 3,876,654 | 4/1975 | Pattison | 260/30.4 R |
| 4,035,565 | 7/1977 | Apotheker et al. | 526/249 |
| 4,233,427 | 11/1980 | Bargain et al. | 525/478 |
| 4,243,770 | 1/1981 | Tatemoto et al. | 525/331 |
| 4,259,463 | 3/1981 | Moggi et al. | 525/331 |
| 4,281,092 | 7/1981 | Breazeale | |
| 4,564,662 | 1/1986 | Albin | 526/247 |
| 4,694,045 | 9/1987 | Moore | 525/276 |
| 4,745,165 | 5/1988 | Arcella et al. | 526/247 |
| 4,789,717 | 12/1988 | Giannetti et al. | 526/209 |
| 4,864,006 | 9/1989 | Giannetti et al. | 526/209 |
| 4,943,622 | 7/1990 | Naraki et al. | 526/206 |
| 5,173,553 | 12/1992 | Albano et al. | 526/238 |
| 5,214,115 | 5/1993 | Langstein et al. | 526/247 |
| 5,274,179 | 12/1993 | Wu | |
| 5,393,852 | 2/1995 | Ishibe et al. | |

FOREIGN PATENT DOCUMENTS

| | | |
|---|---|---|
| 0014930 | 9/1980 | European Pat. Off. |
| 0120462 | 10/1984 | European Pat. Off. |
| 0136596 | 4/1985 | European Pat. Off. |
| 0182299 | 5/1986 | European Pat. Off. |
| 0199138 | 10/1986 | European Pat. Off. |
| 0335705 | 10/1989 | European Pat. Off. |
| 0410351 | 1/1991 | European Pat. Off. |

OTHER PUBLICATIONS

CA 112:98021 Akihiko et al JP01172353.
CA 112:157678 Yuji et al JP01226844.
JP 01-226844 by Yuji et al, Sep. 11, 1989.
Database Chemical Abstracts (Host: STN):Abstract N. 120: 55 320, Colombus, Ohio USA; & JP-A-05 230 151 (Asahi Glass Co. Ltd.), 7 Jul. 1993.

*Primary Examiner*—Joseph L. Schofer
*Assistant Examiner*—N. Sarofin
*Attorney, Agent, or Firm*—Watson Cole Stevens Davis, P.L.L.C.

[57] ABSTRACT

New fluoroelastomers are described, comprising monomeric units deriving from a bis-olefin having general formula:

$$R_1R_2C=\underset{R_3}{C}-Z-\underset{R_4}{C}=CR_5R_6 \qquad (I)$$

wherein:
$R_1, R_2, R_3, R_4, R_5, R_6$, equal or different from each other, are H or alkyls $C_1$–$C_5$; Z is an alkylene or cycloalkylene radical $C_1$–$C_{18}$, linear or branched, optionally containing oxygen atoms, preferably at least partially fluorinated, or a (per)fluoropolyoxyalkylene radical.

Such products are endowed with improved processability, especially during calendering of the vulcanization mixture, along with superior mechanical and workability properties during extrusion and injection molding, with a very good mold release.

22 Claims, No Drawings

FLUOROELASTOMERS COMPRISING MONOMERIC UNITS DERIVING FROM A BIS-OLEFIN

The present invention relates to new fluoroelastomers endowed with improved processability and very good mechanical and elastic properties.

Various types of fluoroelastomers are known in the art, broadly used in all of those fields where very good elastic properties combined with high thermochemical stability are required. For a wide survey of such products see for instance "Ullmann's Encyclopedia of Industrial Chemistry", Vol. A-11, pages 417–429 (1988, VCH Verlagsgesellschaft).

The vulcanization of fluoroelastomers can be carried out either ionically or by means of peroxides. In the former case, suitable curing agents (for instance polyhydroxylated compounds) combined with accelerators (for instance tetraalkylammonium salts) are added to the fluoroelastomer. In the case of peroxide curing, the polymer must contain curing sites capable of forming radicals in the presence of peroxides. To this purpose, "cure-site" monomers containing iodine and/or bromine can be introduced into the chain, as described for instance in U.S. Pat. Nos. 4,035,565, 4,745,165 and EP-199,138, or iodine- and/or bromine-containing chain transfer agents can be used during polymerization, which form iodinated and/or brominated end-groups (see for instance U.S. Pat. Nos. 4,243,770 and 5,173,553).

A drawback usually encountered during the formulation of vulcanization mixtures is the scarce workability, particularly during calendering, which requires long times, especially as regards incorporation of additives and fillers into the mixture. By additives it is meant all of those products entering the vulcanization mixture which act as curing agents, antioxidants, stabilizers, etc., while the fillers are generally products which act as pigments, thickeners, reinforcing agents, plasticizers, etc. (carbon black, divalent metal oxides and hydrooxides, silicon, talc, etc.).

It is known that polymers having a wide molecular weight distribution generally show a better processability, therefore the aforesaid drawback might be overcome by modifying the fluoroelastomer molecular weight distribution acting on the polymerization process parameters, in particular the amount and/or the modalities of feeding into the reactor of the initiator and of the chain transfer agent. However, such expedients lead to a product showing clear swelling phenomena after extrusion, as shown by Garvey rate measurements.

It is also known that an improvement in the fluoroelastomer processability is obtainable by suitably mixing polymers having different molecular weight distribution. As unavoidable consequence, in addition to swelling phenomena after extrusion, a worsening of mechanical properties and moldability of the final product occurs.

The Applicant has now surprisingly found that it is possible to obtain new fluoroelastomers endowed with improved processability, especially during calendering of the vulcanization mixture, along with very good mechanical and processing properties during extrusion and injection molding, with a very good mold release. Such result is obtained by introducing into the polymer chain small amounts of a bis-olefin, whose structure is defined hereinafter.

Object of the present invention is therefore a fluoroelastomer comprising monomeric units deriving from a bis-olefin having general formula:

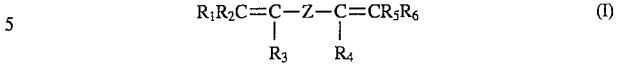

wherein:
$R_1$, $R_2$, $R_3$, $R_4$, $R_5$, $R_6$, equal or different from each other, are H or alkyls $C_1$–$C_5$;
Z is an alkylene or cycloalkylene radical $C_1$–$C_{18}$, linear or branched, optionally containing oxygen atoms, preferably at least partially fluorinated, or a (per)fluoropolyoxyalkylene radical.

In formula (I), Z is preferably a perfluoroalkylene radical $C_4$–$C_{12}$, more preferably a perfluoroalkylene radical $C_4$–$C_8$, whereas $R_1$, $R_2$, $R_3$, $R_4$, $R_5$, $R_6$ are preferably hydrogen.

When Z is a (per)fluoropolyoxyalkylene radical, it has preferably the formula:

wherein: Q is an alkylene or oxyalkylene radical $C_1$–$C_{10}$; p is 0 or 1; m and n are integers such that the m/n ratio is comprised between 0.2 and 5 and the molecular weight of said (per)fluoropolyoxyalkylene radical is comprised between 500 and 10,000, preferably between 1,000 and 4,000. Preferably, Q is selected from: —$CH_2OCH_2$—; —$CH_2O(CH_2CH_2O)_sCH_2$—, s=1–3.

The bis-olefins of formula (I) wherein Z is an alkylene or cycloalkylene radical can be prepared according to what described, for instance, by I. L. Knunyants et al in Izv. Akad. Nauk. SSSR, Ser. Khim., 1964(2), 384–6, while the bis-olefins containing (per)fluoropolyoxyalkylene sequences are described in U.S. Pat. No. 3,810,874.

The amount of units in the chain deriving from such bis-olefins is generally comprised between 0.01 and 1.0 mols, preferably between 0.03 and 0.5 mols, even more preferably between 0.05 and 0.2 moles per 100 moles of the other base monomeric units.

The base structure of the fluoroelastomer can be in particular selected from:

(1) VDF-based copolymers, wherein VDF is copolymerized with at least a comonomer selected from: perfluoroolefins $C_2$–$C_8$, such as tetrafluoroethylene (TFE), hexafluoropropene (HFP); chloro- and/or bromo- and/or iodo-fluoroolefins $C_2$–$C_8$, such as chlorotrifluoroethylene (CTFE) and bromotrifluoroethylene; (per)fluoroalkylvinylethers (PAVE) $CF_2$=$CFOR_f$, wherein $R_f$ is a (per)fluoroalkyl $C_1$–$C_6$, for instance trifluoromethyl, bromodifluoromethyl, pentafluoropropyl; perfluoro-oxyalkylvinylethers $CF_2$=$CFOX$, wherein X is a perfluoro-oxyalkyl $C_1$–$C_{12}$ having one or more ether groups, for instance perfluoro-2-propoxypropyl; non-fluorinated olefins (Ol) $C_2$–$C_8$, for instance ethylene and propylene;

(2) TFE-based copolymers, where TFE is copolymerized with at least a comonomer selected from: (per)fluoroalkylvinylethers (PAVE) $CF_2$=$CFOR_f$, wherein $R_f$ is defined as above; perfluoro-oxyalkylvinylethers $CF_2$=$CFOX$, wherein X is defined as above; fluoroolefins $C_2$–$C_8$ containing hydrogen and/or chlorine and/or bromine and/or iodine atoms; non-fluorinated olefins (Ol) $C_2$–$C_8$.

Within the classes defined above, the preferred base monomer compositions are the following (% by moles): (a) VDF 45–85%, HFP 15–45%, 0–30% TFE; (b) VDF 50–80%, PAVE 5–50%, TFE 0–20%; (c) VDF 20–30%, Ol 10–30%, HFP and/or PAVE 18–27%, TFE 10–30%; (d) TFE 50–80%, PAVE 20–50%; (e) TFE 45–65%, Ol 20–55%, 0–30% VDF; (f) TFE 32–60%, Ol 10–40%, PAVE 20–40%; (g) TFE 33–75%, 15–45% PAVE, 10–22% VDF.

It is important to point out that, in the case of peroxide curable fluoroelastomers, the addition of small amounts of a bis-olefin according to the present invention allows to obtain further outstanding advantages. It is indeed known that, in order to reach a good vulcanization level, it is necessary to increase as much as possible the amount of reactive sites, namely the iodine and/or bromine amount per chain. For that purpose, we can try to increase the amount of iodinated and/or brominated chain transfer agent, avoiding as far as possible a decay of the reaction rate. Apart from the operating difficulties that such a method involves, the number of iodine and/or bromine atoms per chain can be at most equal to two, since the chain transfer agents known in the art contain at most two iodine and/or bromine atoms. Practically, such theoretical limit is never reached just because it is not possible to increase the chain transfer agent/initiator ratio beyond certain limits without causing an unacceptable decrease of reaction rate. Following such a method, the maximum obtainable number of iodine and/or bromine atoms per chain is usually of about 1.8. Therefore, the vulcanization level of the final product turns out to be insufficient for many applications where high elastic properties are required. For instance, the compression set value for such products is generally equal to at least 28–30% (measured at 200° C. for 70 hours according to standard ASTM D395, Method B).

As clearly results by comparing the working examples of the invention with the comparative ones reported hereinbelow, the introduction of small amounts of a bis-olefin according to the present invention causes a sort of pre-curing of the product (as shown by the high molecular weights which are reached) and allows, in the case of peroxide curing, to remarkably increase the amount of terminal iodine and/or bromine per chain if compared with the same polymer prepared without the bis-olefin. Consequently, it is possible to reach high vulcanization levels and thus exceptionally low compression set values. For instance, in the case of O-rings, the compression set, measured at 200° C. for 70 hours according to standard ASTM D395 Method B, is generally lower than 25%.

The preparation of the fluoroelastomers object of the present invention can be carried out by copolymerization of the monomers in aqueous emulsion according to methods well known in the art, in the presence of radical initiators (for instance, alkali metal or ammonium persulphates, perphosphates, perborates or percarbonates), optionally in combination with ferrous, cuprous or silver salts, or other readily oxidable metals. In the reaction medium also. surfactants of various type are usually present, among which particularly preferred are the fluorinated surfactants of formula:

wherein $R_f$ is a (per)fluoroalkyl chain $C_5$–$C_{16}$ or a (per)fluoropolyoxyalkylene chain, $X^-$ is —COO$^-$ or —SO$_3^-$, $M^+$ is selected from: $H^+$, $NH_4^+$, an alkali metal ion. Among the most commonly used we can cite: ammonium perfluorooctanoate, (per)fluoropolyoxyalkylenes terminated with one or more carboxylic groups, etc.

The bis-olefin amount to be added to the reaction mixture depends on the quantity of units deriving therefrom which are desired in the final product, keeping in mind that, at the low amounts used according to the purposes of the present invention, practically all of the bis-olefin present in the reaction medium enters the chain.

When the polymerization is concluded, the fluoroelastomer is isolated from the emulsion by means of conventional methods, such as coagulation by addition of electrolytes or by cooling.

Alternatively, the polymerization reaction can be carried out in mass or in suspension, in an organic liquid where a suitable radical initiator is present, according to well known techniques.

The polymerization reaction is generally carried out at temperatures of from 25° to 150° C., under pressure up to 10 MPa.

The preparation of the fluoroelastomers object of the present invention is preferably carried out in aqueous emulsion in the presence of an emulsion, dispersion or microemulsion of perfluoropolyoxyalkylenes, according to what described in U.S. Pat. Nos. 4,789,717 and 4,864,006.

The fluoroelastomers object of the present invention are preferably cured by peroxides, hence they preferably contain in the chain and/or in the end groups of the macromolecules iodine and/or bromine atoms. The introduction of such iodine and/or bromine atoms can be achieved by addition, in the reaction mixture, of brominated and/or iodinated "cure-site" comonomers, such as bromine and/or iodine olefins having from 2 to 10 carbon atoms (as described for instance in U.S. Pat. Nos. 4,035,565 and 4,694,045), or iodine and/or bromine fluoroalkylvinylethers (as described in U.S. Pat. Nos. 4,745,165, 4,564,662 and EP-199,138), in such amounts that the "cure-site" comonomer content in the final product is generally comprised between 0.05 and 2 moles per 100 moles of the other base monomeric units.

Alternatively or also in association with "cure-site" comonomers, it is possible to introduce terminal iodine and/or bromine atoms by adding to the reaction mixture iodinated and/or brominated chain transfer agents, such as for instance compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2, with $1 \leq x+y \leq 2$ (see for instance U.S. Pat. Nos. 4,243,770 and 4,943,622). It is also possible to use as chain transfer agents alkali or alkaline-earth metal iodided and bromides, according to what described in U.S. Pat. No. 5,173,553.

Alternatively, or in association with iodine and/or bromine containing chain transfer agents, other chain transfer agents known in the art can be employed, such as ethyl acetate, diethylmalonate, etc.

The peroxide curing is carried out, according to known techniques, by adding a suitable peroxide capable of generating radicals by heating. Among the most commonly used, we can cite: dialkylperoxides, such as for instance ditertbutyl-peroxide and 2,5-dimethyl-2,5-di(tertbutylperoxy)hexane; dicumyl peroxide; dibenzoyl peroxide; diterbutyl perbenzoate; di[1,3-dimethyl-3-(terbutyl-peroxy)butyl]carbonate. Other peroxide systems are described, for instance, in patent applications EP-136,596 and EP-410,351.

To the vulcanization mixture other products are also added, such as:

(a) curing coagents, in amounts generally comprised between 0.5 and 10%, preferably between 1 and 7%, by weight with respect to the polymer; among them, commonly used are: triallyl-cyanurate; triallyl-isocyanurate (TAIC); tris(diallylamine)-s-triazine; triallylphosphite; N,N-diallyl-acrylamide; N,N,N',N'-tetraallyl-malonamide; trivinyl-isocyanurate; 2,4,6-trivinyl-methyltrisiloxane, etc.; TAIC is particularly preferred;

(b) a metal compound, in amounts comprised between 1 and 15%, preferably between 2 and 10%, by weight with respect to the polymer, selected from oxides or hydroxides of divalent metals, such as for instance Mg, Zn, Ca or Pb, optionally associated with a weak acid salt, such as for instance Ba, Na, K, Pb, Ca stearates, benzoates, carbonates, oxalates or phosphites;

(c) other conventional additives, such as thickeners, pigments, antioxidants, stabilizers and the like.

In the case that the fluoroelastomers object of the present invention are intended to be ionically cured, in addition to the products indicated above at items (b) and (c), suitable curing agents and accelerators well known in the art are added to the vulcanization mixture. For instance, as curing agents, aromatic or aliphatic polyhydroxylated compounds or derivatives thereof can be employed, as described for instance in EP-335,705 and U.S. Pat. No. 4,233,427. Among them we can cite in particular: di-, tri- and tetra-hydroxy benzenes, naphthalenes or anthracenes; bisphenols wherein the two aromatic rings are linked each other through an aliphatic, cycloaliphatic or aromatic divalent radical, or through an oxygen or sulphur atom, or also a carbonyl group. The aromatic rings can be replaced by one or more chlorine, fluorine, bromine atoms or by carbonyl, alkyl, acyl groups.

As accelerators there can be used for instance: ammonium, phosphonium, arsonium or antimonium quaternary salts (see for instance EP-335,705 and U.S. Pat. No. 3,876,654); amino-phosphonium salts (see for instance U.S. Pat. No. 4,259,463); phosphoranes (see for instance U.S. Pat. No. 3,752,787); the imine compounds described in EP-182,299 and EP-120,462; etc.

It is also possible to use mixed curing systems, both ionic and peroxidic, as described in EP-136,596.

The present invention will be now better illustrated by the following working examples, which have a purpose merely indicative but not limitative of the scope of the invention itself.

The calendering processability was evaluated by measurements of Black Incorporation Time (BIT), i.e. of the time that the polymer takes to incorporate fillers during calendering. Operatively, such measurement was carried out with a calender having rolls with a 150 mm diameter, to which about 0.5 kg of polymer was caused to adhere. As soon as the polymer formed an uniform layer on the rolls, the fillers were added with an amount as reported in the tables: the BIT is defined as the time elapsing from the filler addition to the moment when the latter are no longer released from the rolls themselves. Of course, the lower the BIT, the higher the rate of filler incorporation, and thus the higher the calendering process productivity.

EXAMPLE 1

In a 5 l autoclave, equipped with a stirrer working at rpm, were charged, after evacuation, 4 l of demineralized water and 41.1 ml of a perfluoropolyoxyalkylene microemulsion previously obtained by mixing:

8.9 ml of an acid-terminated perfluoropolyoxyalkylene of formula:

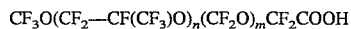

$CF_3O(CF_2-CF(CF_3)O)_n(CF_2O)_mCF_2COOH$ wherein n/m=10, having average molecular weight of 600;

8.9 ml of a 30% by volume aqueous $NH_4OH$ solution;

17.8 ml of demineralized water;

5.5 ml of Galden® D02 of formula:

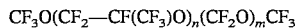

$CF_3O(CF_2-CF(CF_3)O)_n(CF_2O)_mCF_3$ wherein n/m=20, having average molecular weight of 450.

The autoclave was then brought to 85° C. and kept at such temperature for the whole duration of the reaction. The following monomer mixture was then fed:

| vinylidene fluoride (VDF) | 14.7% by moles |
| hexafluoropropene (HFP) | 78.0% by moles |
| tetrafluoroethylene (TFE) | 7.3% by moles | so as to bring the pressure to 22 bar.

In the autoclave were then introduced:

ammonium persulphate (APS) as initiator, in the form of an aqueous solution having a 50 g/l concentration; the addition was carried out in 10 portions, the first one of 30 ml, the subsequent ones each of 3.4 ml every 10% increase in the monomer conversion;

1,4-diiodoperfluorobutane ($C_4F_8I_2$) as chain transfer agent, in the form of solution obtained dissolving 4.26 ml of the iodinated product in 45.74 ml of the same Galden® D02 used for the microemulsion; the addition was carried out in 20 portions, each of 2.5 ml, beginning from the polymerization start and every 5% increase in the monomer conversion;

the bis-olefin of formula

$CH_2=CH-(CF_2)_5-CH=CH_2$, in the form of solution obtained dissolving 2.5 ml in 47.5 ml of the same Galden® D02described above; the addition was carried out in 20 portions, each of 2.5 ml, beginning from the polymerization start and every 5% increase in the monomer conversion.

The 22 bar pressure was kept constant for the whole duration of the polymerization by feeding a mixture consisting of:

| VDF | 50% by moles |
| HFP | 26% by moles |
| TFE | 24% by moles |

After 23 minutes of reaction, the autoclave was cooled, the latex discharged and the polymer coagulated, washed and dried. 622 g of product were so obtained, which was characterized as reported in Table 1.

The monomer composition of the polymer was determined by $^{19}$F-NMR and IR analysis, the iodine percentage by measurements of X-ray fluorescence. The average molecular weights $M_n$ (number), $M_w$ (weight) and $M_z$ were measured by gel permeation chromatography (GPC), from which the osmometric molecular weight ($M_{osm}$) was calculated by means of calibration curves.

The polymer was then peroxide cured: the vulcanization mixture composition and the characteristics of the cured product are reported in Table 2.

EXAMPLE 2

Comparative

Following the same procedure as described in Example 1, a polymer of the same type but devoid of the bis-olefin was prepared. The characteristics of the product as such and of that peroxide cured are reported in Tables 1 and 2 respectively.

TABLE 1

| EXAMPLE | 1 | 2[*] |
|---|---|---|
| Polymer composition (% mole) | | |
| VDF | 50 | 50 |
| HFP | 26 | 26 |
| TFE | 24 | 24 |
| bis-olefin | 0.16 | — |
| Iodine (% by wt.) | 0.64 | 0.63 |
| (per chain) | 3.4 | 1.5 |
| Mooney viscosity (ASTM D1646) | | |
| ML(1 + 10') 121° C. | 11 | n.d. |
| ML(1 + 4') 100° C. | 25 | 4 |
| Intrinsic viscosity [η] | 37.8 | 23.7 |
| (at 30° C. in MEK) | | |
| $T_g$ onset (°C.) | −12.3 | −14.3 |
| (DSC - ASTM D 3418-82) | | |
| $M_n$ | 30,000 | 24,000 |
| $M_w$ | 136,000 | 40,000 |
| $M_z$ | 497,000 | 59,000 |
| $M_w/M_n$ | 4.5 | 1,6 |
| $M_z/M_w$ | 3.6 | 1,5 |
| $M_{osm}$ | 67,000 | 35,000 |

[*]comparative
n.d.: not determinable

TABLE 2

| EXAMPLE | 1 | 2[*] |
|---|---|---|
| Vulcanization mixture composition | | |
| Polymer (g) | 100 | 100 |
| Luperco® 101 XL (phr) | 3 | 3 |
| Drimix® TAIC (phr) | 4 | 4 |
| ZnO (phr) | 5 | 5 |
| Carbon black MT (phr) | 30 | 30 |
| Vulcanization mixture characteristics | | |
| *Mooney viscosity ML(1 + 10') 121° C. (ASTM D1646) | 17 | 2 |
| *ODR 177° C. arc 3, 12' (ASTM D2084-81) | | |
| ML (pounds · inch) | 4 | 1 |
| MH (pounds · inch) | 134 | 120 |
| $t_{s2}$ (sec) | 42 | 60 |
| $t_{s50}$ (sec) | 63 | 78 |
| $t'_{90}$ (sec) | 96 | 108 |
| $V_{max}$ (pounds · foot · inch/sec) | 3.36 | 3.42 |
| Properties after curing in press at 170° C. for 10 min | | |
| *MECHANICAL PROPERTIES (ASTM D412-83) | | |
| Modulus at 100% (MPa) | 7.5 | n.d. |
| Stress at break (MPa) | 13.2 | n.d. |
| Elongation at break (%) | 158 | n.d. |
| Shore Hardness A (points) | 67 | n.d. |
| Properties after post-curing in oven at 230° C. for 24 hours | | |
| *MECHANICAL PROPERTIES (ASTM D412-83) | | |
| Modulus at 100% (MPa) | 8.0 | n.d. |
| Stress at break (MPa) | 16.3 | n.d. |
| Elongation at break (%) | 16.2 | n.d. |
| Hardness Shore A (points) | 69 | n.d. |
| *COMPRESSION SET at 200° C. for 70 hours (ASTM D395 Method B) | | |
| O-ring 214 (%) | 38 | n.d. |
| Disc (%) | 15 | n.d. |

[*]comparative
n.d.: not determinable

EXAMPLE 3

In a 5 l auoclave, equipped with a stirrer working at 630 rpm, were charged, after evacuation, 3.5 l of demineralized water and 36.0 ml of a perfluoropolyoxyalkylene microemulsion previously obtained by mixing:

7.8 ml of an acid-terminated perfluoropolyoxyalkylene of formula:

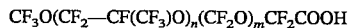

$$CF_3O(CF_2-CF(CF_3)O)_n(CF_2O)_mCF_2COOH$$

wherein n/m=10, having average molecular weight of 600;

7.8 ml of a 30% by volume $NH_4OH$ aqueous solution;

15.6 ml of demineralized water;

5.5 ml of Galden® D02 of formula:

$$CF_3O(CF_2-CF(CF_3)O)_n(CF_2O)_mCF_3$$

wherein n/m=20, having average molecular weight of 450.

The autoclave was then brought to 80° C. and kept at such temperature for the whole duration of the reaction. The following monomer mixture was then fed:

| | |
|---|---|
| vinylidene fluoride (VDF) | 45% by moles |
| perfluoromethylvinylether (MVE) | 36% by moles |
| tetrafluoroethylene (TFE) | 19% by moles | so as to bring the pressure to 22 bar.

In the autoclave were then introduced:

ammonium persulphate (APS) as initiator, in the form of an aqueous solution having concentration of 2 g/l; the addition was carried out in a single portion of 50 ml;

1,4-diiodoperfluorobutane ($C_4F_8I_2$) as chain transfer agent, in the form of solution obtained dissolving 4.26 ml of the iodinated product in 45.74 ml of the same Galden® D02 used for the microemulsion; the addition was carried out in 20 portions, each of 2.5 ml, beginning from the polymerization start and every 5% increase in the monomer conversion;

the bis-olefin of formula

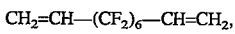

$$CH_2=CH-(CF_2)_6-CH=CH_2,$$

in the form of a solution obtained dissolving 2.9 ml in 47.1 ml of the same Galden® D02 described above; the addition was carried out in 20 portions, each of 2.5 ml, beginning from the polymerization start and every 5% increase in the monomer conversion.

The pressure of 22 bar was kept constant for the whole duration of the polymerization by feeding a mixture consisting of:

|     |              |
| --- | ------------ |
| VDF | 58% by moles |
| MVE | 18% by moles |
| TFE | 24% by moles |

After 116 minutes of reaction, the autoclave was cooled, the latex discharged and the polymer coagulated, washed and dried. 1500 g of product were so obtained, which was characterized as reported in Table 3.

The polymer was then vulcanized by means of peroxides: the vulcanization mixture composition and the characteristics of the cured product are reported in Table 4.

EXAMPLE 4

Comparative

Following the same procedure as described in Example 3, a polymer of the same type but devoid of the bis-olefin was prepared. The characteristics of the product as such and of that cured by means of peroxides, are reported in Tables 3 and 4 respectively.

TABLE 3

| EXAMPLE | 3 | 4(*) |
| --- | --- | --- |
| Polymer composition (% mole) | | |
| VDF | 59.2 | 60.1 |
| MVE | 17.6 | 18.2 |
| TFE | 23.2 | 21.7 |
| bis-olefin | 0.074 | — |
| Iodine (% by wt.) | 0.29 | 0.29 |
| (per chain) | 2.05 | 1.53 |
| Mooney viscosity (ASTM D1646) | | |
| ML(1 + 10') 121° C. | 56 | 20 |
| ML(1 + 4') 100° C. | 80 | 37 |
| Intrinsic viscosity [η] (at 30° C. in MEK) | 89 | 72.6 |
| $T_g$ onset (°C.) (DSC - ASTM D 3418-82) | −30.7 | −30.8 |
| $M_n$ | 81,000 | 62,000 |
| $M_w$ | 467,000 | 212,000 |
| $M_z$ | 2,688,000 | 1,038,000 |
| $M_w/M_n$ | 5.8 | 3.4 |
| $M_z/M_w$ | 5.7 | 4.9 |
| $M_{osm}$ | 90,000 | 67,000 |

(*)comparative

TABLE 4

| EXAMPLE | 3 | 4(*) |
| --- | --- | --- |
| Vulcanization mixture composition | | |
| Polymer (g) | 100 | 100 |
| Luperco(R) 101 XL (phr) | 3 | 3 |
| Drimix(R) TAIC (phr) | 4 | 4 |
| ZnO (phr) | 5 | 5 |
| Carbon black MT (phr) | 30 | 30 |
| Vulcanization mixture characteristics | | |
| *Mooney viscosity ML(1 + 10') 121° C. (ASTM D1646) | 43 | 21 |
| *ODR 177° C. arc 3, 12' (ASTM D2084-81) | | |
| ML (pounds · inch) | 14 | 4 |
| MH (pounds · inch) | 133 | 127 |
| $t_{s2}$ (sec) | 48 | 51 |
| $t_{s50}$ (sec) | 75 | 81 |
| $t'_{90}$ (sec) | 105 | 105 |
| $V_{max}$ (pounds · foot · inch/sec) | 2.63 | 3.19 |

TABLE 4-continued

| EXAMPLE | 3 | 4(*) |
| --- | --- | --- |
| Properties after-curing in press at 170° C. for 10 min | | |
| *MECHANICAL PROPERTIES (ASTM D412-83) | | |
| Modulus at 100% (MPa) | 5.1 | 4.4 |
| Stress at break (MPa) | 16.5 | 16.8 |
| Elongation at break (%) | 199 | 224 |
| Hardness Shore A (points) | 69 | 69 |
| Properties after host-curing in oven at 200° C. for 30 min | | |
| *MECHANICAL PROPERTIES (ASTM D412-83) | | |
| Modulus at 100% (MPa) | 5.1 | 4.7 |
| Stress at break (Mpa) | 18.3 | 17.8 |
| Elongation at break (%) | 210 | 225 |
| Hardness Shore A (points) | 69 | 69 |
| *COMPRESSION SET at 200° C. for 70 hours (ASTM D395 Method B) | | |
| O-ring 214 (%) | 24 | 28 |

(*)comparative

EXAMPLE 5

In a 5 l auoclave, equipped with a stirrer working at 630 rpm, were charged, after evacuation, 3.5 l of demineralized water and 36.0 ml of a perfluoropolyoxyalkylene microemulsion previously obtained by mixing:

7.8 ml of an acid-terminated perfluoropolyoxyalkylene of formula:

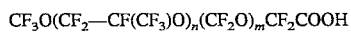

$$CF_3O(CF_2-CF(CF_3)O)_n(CF_2O)_mCF_2COOH$$

wherein n/m=10, having average amolecular weight of 600;

7.8 ml of a 30% by volume NH$_4$OH aqueous solution;

15.6 ml of demineralized water;

5.5 ml of Galden® D02 of formula:

$$CF_3O(CF_2-CF(CF_3)O)_n(CF_2O)_mCF_3$$

wherein n/m=20, having average molecular weight of 450.

The autoclave was then brought to 80° C. and kept at such temperature for the whole duration of the reaction. The following monomer mixture was then fed:

| | |
| --- | --- |
| vinylidene fluoride (VDF) | 27% by moles |
| perfluoropropene (HFP) | 57% by moles |
| tetrafluoroethylene (TFE) | 16% by moles | so as to bring the pressure to 25 bar.

In the autoclave were then introduced:

ammonium persulphate (APS) as initiator, in the form of an aqueous solution having concentration of 1 g/l; the addition was carried out in a single portion of 140 ml;

1,4-diiodoperfluorobutane (C$_4$F$_8$I$_2$) as chain transfer agent, in the form of a solution obtained dissolving 4.4 ml of the iodinated product in 50 ml of the same Galden® D02 used for the microemulsion; the addition was carried out in a single portion when the polymerization start was detected;

the bis-olefin of formula $$CH_2=CH-(CF_2)_6-CH=CH_2,$$

in the form of a solution obtained dissolving 3.7 ml in 46.3 ml of the same Galden® D02 described above; the addition was carried out in 20 portions, each of 2.5 ml, beginning from the polymerization start and every 5% increase in the monomer conversion.

The pressure of 25 bar was kept constant for the whole duration of the polymerization by feeding a mixture consisting of:

| | |
|---|---|
| VDF | 50% by moles |
| HFP | 26% by moles |
| TFE | 24% by moles |

After 130 minutes of reaction, the autoclave was cooled, the latex discharged and the polymer coagulated, washed and dried. 1550 g of product were so obtained, which was characterized as reported in Table 5.

The polymer was then vulcanized by means of peroxides: the vulcanization mixture composition and the characteristics of the cured product are reported in Table 6.

EXAMPLE 6

Comparative

Following the same procedure as described in Example 5, a polymer of the same type, but devoid of the bis-olefin and using an amount of iodinated chain transfer agent of 2.6 ml, was prepared. The characteristics of the product as such and of that vulcanized by means of peroxides are reported in Tables 5 and 6 respectively.

TABLE 5

| EXAMPLE | 5 | 6(*) |
|---|---|---|
| Polymer composition (% mole) | | |
| VDF | 52.2 | 53.1 |
| HFP | 23.6 | 23.2 |
| TFE | 24.2 | 23.7 |
| bis-olefin | 0.093 | — |
| Iodine (% by wt.) | 0.32 | 0.18 |
| (per chain) | 2.64 | 1.1 |
| Mooney viscosity (ASTM D1646) | | |
| ML(1 + 10') 121° C. | 54 | 51 |
| ML(1 + 4') 100° C. | 99 | 89 |
| $T_g$ onset (°C.) | −12.0 | −13.2 |
| (DSC - ASTM D 3418-82) | | |
| $M_n$ | 81,000 | 69,000 |
| $M_w$ | 315,000 | 163,000 |
| $M_z$ | 958,000 | 333,000 |
| $M_w/M_n$ | 3.9 | 2.3 |
| $M_z/M_w$ | 3.0 | 2.0 |
| $M_{osm}$ | 105,000 | 78,000 |

(*)comparative

TABLE 6

| EXAMPLE | 5 | 6(*) |
|---|---|---|
| Vulcanization mixture composition | | |
| Polymer (g) | 100 | 100 |
| Luperco® 101 XL (phr) | 3 | 3 |
| Drimix® TAIC (phr) | 4 | 4 |
| ZnO (phr) | 5 | 5 |
| Carbon black MT (phr) | 30 | 30 |

TABLE 6-continued

| EXAMPLE | 5 | 6(*) |
|---|---|---|
| Vulcanization mixture characteristics | | |
| *Mooney viscosity ML(1 + 10') 121° C. (ASTM D1646) | 41 | 48 |
| *ODR 177° C. arc 3, 12' (ASTM D2084-81) | | |
| ML (pounds · inch) | 14 | 15 |
| MH (pounds · inch) | 141 | 120 |
| $t_{s2}$ (sec) | 40 | 75 |
| $t_{s50}$ (sec) | 61 | 105 |
| $t'_{90}$ (sec) | 90 | 160 |
| $V_{max}$ (pounds · foot · inch/sec) | 2.7 | 2.2 |
| Properties after curing in press at 170° C. for 10 min | | |
| *MECHANICAL PROPERTIES (ASTM D412-83) | | |
| Modulus at 100% (MPa) | 7.5 | 5.6 |
| Stress at break (Mpa) | 21.4 | 19.2 |
| Elongation at break (%) | 250 | 260 |
| Hardness Shore A (points) | 78 | 76 |
| Properties after post-curing in oven at 200° C. for 30 min | | |
| *MECHANICAL PROPERTIES (ASTM D412-83) | | |
| Modulus at 100% (MPa) | 8.5 | 6.2 |
| Stress at break (MPa) | 23.7 | 21.6 |
| Elongation at break (%) | 260 | 251 |
| Hardness Shore A (points) | 79 | 76 |
| *COMPRESSION SET at 200° C. for 70 hours ASTM D395 Method B) | | |
| O-ring 214 (%) | 23 | 30 |

(*)comparative

EXAMPLE 7

In a 5 l autoclave, equipped with a stirrer working at rpm, were charged, after evacuation, 4.0 l of demineralized water and 410.1 ml of a perfluoropolyoxyalkylene microemulsion previously obtained by mixing:

8.9 ml of an acid-terminated perfluoropolyoxyalkylene of formula:

$$CF_3O(CF_2-CF(CF_3)O)_n(CF_2O)_mCF_2COOH$$

wherein n/m=10, having average molecular weight of 600;

8.9 ml of a 30% by volume NH$_4$OH aqueous solution;

17.8 ml of demineralized water;

5.5 ml of Galden® D02 of formula:

$$CF_3O(CF_2-CF(CF_3)O)_n(CF_2O)_mCF_3$$

wherein n/m=20, having average molecular weight of 450.

The autoclave was then brought to 85° C. and kept at such temperature for the whole duration of the reaction. The following monomer mixture was then fed:

| | |
|---|---|
| vinylidene fluoride (VDF) | 53.5% by moles |
| perfluoropropene (HFP) | 46.5% by moles | so as to bring the pressure to 22 bar.

In the autoclave were then introduced:

ammonium persulphate (APS) as initiator, in the form of an aqueous solution having concentration of 50 g/l; the addition was carried out in 10 portions, the first one of 40.4 ml, the following ones each of 4.4 ml every 10% increase in the monomer conversion;

ethylacetate as chain transfer agent, in the form of a solution obtained dissolving 66 ml thereof in 1000 ml of water; 50 ml thereof were added in a single portion when the polymerization start was detected;

the bis-olefin of formula $$CH_2=CH-(CF_2)_6-CH=CH_2,$$

in the form of a solution obtained dissolving 2.5 ml in 47.5 ml of the same Galden® D02 described above; the addition was carried out in 20 portions, each of 2.5 ml, beginning from the polymerization start and every 5% increase in the monomer conversion.

The pressure of 22 bar was kept constant for the whole duration of the polymerization by feeding a mixture consisting of:

| VDF | 78.5% by moles |
|---|---|
| HFP | 21.5% |

After 30 minutes of reaction, the autoclave was cooled, the latex discharged and the polymer coagulated, washed and dried. 626 g of product were so obtained, which was characterized as reported in Table 7.

The polymer was then ionically vulcanized: the vulcanization mixture composition and the characteristics of the cured product are reported in Table 8.

EXAMPLE 8

Comparative

Following the same procedure described in Example 7, a polymer of the same type but devoid of the bis-oelfin was prepared. The characteristics of the product as such and of that ionically cured are reported in Tables 7 and 8 respectively.

TABLE 7

| EXAMPLE | 7 | 8(*) |
|---|---|---|
| Polymer composition (% mole) | | |
| VDF | 78.7 | 78.2 |
| HFP | 21.3 | 21.8 |
| bis-olefin | 0.14 | — |
| Mooney viscosity (ASTM D1646) | | |
| ML(1 + 10') 121° C. | 70 | 58 |
| ML(1 + 4') 100° C. | 111 | 95 |
| Intrinsic viscosity [η] (at 30° C. in MEK) | 104 | 90 |
| $T_g$ onset (°C.) (DSC - ASTM D 3418-82) | −24.8 | −26.2 |
| $M_n$ | 58,000 | 70,000 |
| $M_w$ | 311,000 | 292,000 |
| $M_z$ | 826,000 | 792,000 |
| $M_w/M_n$ | 5.3 | 4.2 |
| $M_z/M_w$ | 2.6 | 2.7 |

(*)comparative

TABLE 8

| EXAMPLE | 7 | 8(*) |
|---|---|---|
| Vulcanization mixture composition | | |
| Polymer (g) | 100 | 100 |
| M1 (phr) | 4 | 4 |
| M2 (phr) | 1.5 | 1.5 |
| MgO (phr) | 3 | 3 |
| Ca(OH)$_2$ (phr) | 6 | 6 |
| Carbon black MT (phr) | 30 | 30 |
| Black Incorporation Time (BIT) | 2'43" | 4'49" |
| (relating to carbon black, MgO, Ca(OH)$_2$) Vulcanization mixture characteristics | | |
| *Mooney viscosity ML(1 + 10') 121° C. (ASTM D1646) | 112 | 96 |
| *ODR 177° C. arc 3, 12' (ASTM D2084-81) | | |
| ML (pounds · inch) | 20 | 15 |
| MH (pounds · inch) | 112 | 106 |
| $t_{s2}$ (sec) | 162 | 153 |
| $t_{s50}$ (sec) | 237 | 225 |
| $t'_{90}$ (sec) | 336 | 303 |
| $V_{max}$ (pounds · foot · inch/sec) | 1.26 | 1.45 |
| Properties after curing in press at 170° C. for 10 min | | |
| *MECHANICAL PROPERTIES (ASTM D412-83) | | |
| Modulus at 100% (MPa) | 4.5 | 4.2 |
| Stress at break (MPa) | 11.7 | 11.3 |
| Elongation at break (%) | 270 | 274 |
| Hardness Shore A (points) | 70 | 70 |
| Properties after post-curing in oven at 230° C. for 24 hours | | |
| *MECHANICAL PROPERTIES (ASTM D412-83) | | |
| Modulus at 100% (MPa) | 7.2 | 6.4 |
| Stress at break (MPa) | 16.9 | 17.4 |
| Elongation at break (%) | 186 | 203 |
| Hardness Shore A (points) | 72 | 70 |
| *COMPRESSION SET at 200° C. for 70 hours (ASTM D395 Method B) | | |
| O-ring 214 (%) | 17 | 17 |

(*)comparative
M1: master Bisphenol AF/fluoroelastomer (50/50)
M2: master N,N-diethyl-diphenylbenzyl-aminophosphonium chloride/fluoroelastomer (30/70)

EXAMPLE 9

In a 5 l autoclave, equipped with a stirrer working at rpm, were charged, after evacuation, 3.5 l of demineralized water and 36.0 ml of a perfluoropolyoxyalkylene microemulsion previously obtained by mixing:

7.8 ml of an acid-terminated perfluoropolyoxyalkylene of formula:

$$CF_3O(CF_2-CF(CF_3)O)_n(CF_2O)_mCF_2COOH$$

wherein n/m=10, having average molecular weight of 600;

7.8 ml of a 30% by volume aqueous NH$_4$OH solution;

15.6 ml of demineralized water;

4.8 ml of Galden® D02 of formula:

$$CF_3O(CF_2-CF(CF_3)O)_n(CF_2O)_mCF_3$$

wherein n/m=20, having average molecular weight of 450.

The autoclave was then brought to 80° C. and kept at such temperature for the whole duration of the reaction. The following monomer mixture was then fed:

| vinylidene fluoride (VDF) | 30.0% by moles |
|---|---|
| hexafluoropropene (HFP) | 54.0% by moles |
| tetrafluoroethylene (TFE) | 16.0% by moles | so as to bring the pressure to 21 bar.

In the autoclave were then introduced:
140 ml of an ammonium persulphate (APS) aqueous solution having a 1.0 g/l concentration, as initiator;
1,6-diiodoperfluorohexane ($C_6F_{12}I_2$) as chain transfer agent, in the form of solution obtained dissolving 5.5 ml of the iodinated product in 14.5 ml of the same Galden® D02 used for the microemulsion;
the bis-olefin of formula $$CH_2=CH-(CF_2)_8-CH=CH_2,$$

in the form of solution obtained dissolving 2.5 ml in 47.5 ml of the same Galden® D02 described above; the addition was carried out in 20 portions, each of 2.5 ml, beginning from the polymerization start and every 5% increase in the monomer conversion.

The 21 bar pressure was kept constant for the whole duration of the polymerization by feeding a mixture consisting of:

| VDF | 50% by moles |
|---|---|
| HFP | 26% by moles |
| TFE | 24% by moles |

After 164 minutes of reaction, the autoclave was cooled, the latex discharged and the polymer coagulated, washed and dried. 1522 g of product were so obtained, which was characterized as reported in Table 9.

The polymer was then peroxide cured: the vulcanization mixture composition and the characteristics of the cured product are reported in Table 10.

EXAMPLE 10

In a 5 l autoclave, equipped with a stirrer working at rpm, were charged, after evacuation, 3.5 l of demineralized water and 36.0 ml of the perfluoropolyoxyalkylene microemulsion of Example 9.

The autoclave was then brought to 80° C. and kept at such temperature for the whole duration of the reaction. The following monomer mixture was then fed:

| vinylidene fluoride (VDF) | 30.0% by moles |
|---|---|
| hexafluoropropene (HFP) | 54.0% by moles |
| tetrafluoroethylene (TFE) | 16.0% by moles | so as to bring the pressure to 21 bar.

In the autoclave were then introduced:
140 ml of an ammonium persulphate (APS) aqueous solution having a 1.0 g/l concentration, as initiator;
1,6-diiodoperfluorohexane ($C_6F_{12}I_2$) as chain transfer agent, in the form of solution obtained dissolving 5.5 ml of the iodinated product in 14.5 ml of the same Galden® D02 used for the microemulsion;
the bis-olefin of formula:

$$CH_2=CH-CH_2OCH_2-CF_2O-(CF_2CF_2O)_m(CF_2O)_n-CF_2-CH_2OCH_2-CH=CH_2$$

wherein the ratio m/n is 0.5 and the molecular weight of the perfluoropolyoxyalkylene radical is 2,000, in the form of solution obtained dissolving 12.0 ml in 38.0 ml of the same Galden® D02 described above; the addition was carried out in 20 portions, each of 2.5 ml, beginning from the polymerization start and every 5% increase in the monomer conversion.

The 21 bar pressure was kept constant for the whole duration of the polymerization by feeding a mixture consisting of:

| VDF | 50% by moles |
|---|---|
| HFP | 26% by moles |
| TFE | 24% by moles |

After 200 minutes of reaction, the autoclave was cooled, the latex discharged and the polymer coagulated, washed and dried. 1589 g of product were so obtained, which was characterized as reported in Table 9.

The polymer was then peroxide cured: the vulcanization mixture composition and the characteristics of the cured product are reported in Table 10.

TABLE 9

| EXAMPLE | 9 | 10 |
|---|---|---|
| Polymer composition (% mole) | | |
| VDF | 53.6 | 54.1 |
| HFP | 22.4 | 21.0 |
| TFE | 24.0 | 24.9 |
| bis-olefin | 0.05 | 0.07 |
| Iodine (% by wt.) | 0.38 | 0.38 |
| (per chain) | 2.39 | 2.45 |
| Mooney viscosity (ASTM D1646) | | |
| ML(1 + 10') 121° C. | 18 | 22 |
| ML(1 + 4') 100° C. | 43 | 51 |
| Intrinsic viscosity [η] | 41.8 | 45.3 |
| (at 30° C. in MEK) | | |
| $T_g$ onset (°C.) | −12.5 | −13.6 |
| (DSC - ASTM D 3418-82) | | |

TABLE 10

| EXAMPLE | 9 | 10 |
|---|---|---|
| Vulcanization mixture composition | | |
| Polymer (g) | 100 | 100 |
| Luperco® 101 XL (phr) | 3 | 3 |
| Drimix® TAIC (phr) | 4 | 4 |
| ZnO (phr) | 5 | 5 |
| Carbon black MT (phr) | 30 | 30 |
| Vulcanization mixture characteristics | | |
| *Mooney viscosity ML(1 + 10') 121° C. (ASTM D1646) | 26 | 23 |
| *ODR 177° C. arc 3, 12' (ASTM D2084-81) | | |
| ML (pounds · inch) | 6 | 5 |
| MH (pounds · inch) | 137 | 131 |
| $t_{s2}$ (sec) | 57 | 60 |
| $t_{s50}$ (sec) | 90 | 93 |
| $t'_{90}$ (sec) | 120 | 120 |
| $V_{max}$ (pounds · foot · inch/sec) | 3.13 | 2.98 |

TABLE 10-continued

| EXAMPLE | 9 | 10 |
|---|---|---|
| Properties after curing in press at 70° C. for 10 min | | |
| *MECHANICAL PROPERTIES (ASTM D412-83) | | |
| Modulus at 100% (MPa) | 4.3 | 4.2 |
| Stress at break (MPa) | 16.8 | 16.3 |
| Elongation at break (%) | 244 | 243 |
| Shore Hardness A (points) | 69 | 70 |
| Properties after post-curing in oven at 230° C. for 24 hours | | |
| *MECHANICAL PROPERTIES (ASTM D412-83) | | |
| Modulus at 100% (MPa) | 6.1 | 6.2 |
| Stress at break (MPa) | 20.5 | 20.9 |
| Elongation at break (%) | 244 | 232 |
| Hardness Shore A (points) | 72 | 74 |
| *COMPRESSION SET at 200° C. for 70 hours (ASTM D395 Method B) | | |
| O-ring 214 (%) | 28 | 34 |

We claim:

1. A peroxide vulcanizable fluoroelastomer containing iodine and/or bromine atoms in the chain and/or in the terminal positions to the macromolecules and comprising between, about 0.01, and 1.0, moles of monomeric units derived from a bis-olefin per 100 moles of other base monomeric units, said monomeric units derived from a bis-olefin having the formula:

$$R_1R_2C=C-Z-C=CR_5R_6 \quad (I)$$
$$\phantom{R_1R_2C=C}|\phantom{-Z-}|$$
$$\phantom{R_1R_2C=C}R_3\phantom{-Z-}R_4$$

wherein:

$R_1$, $R_2$, $R_3$, $R_4$, $R_5$, $R_6$, equal or different from each other, are H or $C_1$–$C_5$ alkyl groups; Z is a $C_1$–$C_{18}$ alkylene or cycloalkylene radical, linear or branched, optionally containing oxygen atoms, or a (per)fluoropolyoxyalkylene radical.

2. The fluoroelastomer according to claim 1, wherein Z is an alkylene or oxyalkylene radical $C_1$–$C_{10}$, at least partially fluorinated.

3. The fluoroelastomer according to claim 1, wherein Z is a perfluoroalkylene radical $C_4$–$C_{12}$.

4. The fluoroelastomer according to claim 1, wherein Z is a (per)fluoropolyoxyalkylene radical of formula:

$$-(Q)_p-CF_2O-(CF_2CF_2O)_m(CF_2O)_n-CF_2-(Q)_p- \quad (II)$$

wherein: Q is an alkylene or oxyalkylene radical $C_1$–$C_{10}$; p is 0 or 1; m and n are integers such that the m/n ratio is comprised between 0.2 and 5 and the molecular weight of said (per)fluoropolyoxyalkylene radical is comprised between 500 and 10,000.

5. The fluoroelastomer according to claim 4, wherein Q is selected from: $-CH_2OCH_2-$; $-CH_2O(CH_2CH_2O)_sCH_2-$, s=1–3.

6. The fluoroelastomer according to claim 1, wherein $R_1$, $R_2$, $R_3$, $R_4$, $R_5$, $R_6$ are hydrogen.

7. The fluoroelastomer according to claim 1, wherein the amount of monomeric units deriving from the bis-olefin is comprised between 0.03 and 0..5 moles per 100 moles of the other base monomeric units.

8. The fluoroelastomer according to claim 1, wherein the monomeric structure is based on vinylidene fluoride (VDF) copolymerized with at least a comonomer selected from: perfluoroolefins $C_2$–$C_8$; chloro- and/or bromo- and/or iodo-fluoroolefins $C_2$–$C_8$; (per)fluoroalkylvinylethers (PAVE) $CF_2=CFOR_f$, wherein $R_f$ is a (per)fluoroalkyl $C_1$–$C_6$; perfluoro-oxyaalkylvinylethers $CF_2=CFOX$, wherein X is a perfluoro-oxyalkyl $C_1$–$C_{12}$ having one or more ether groups; non-fluorinated olefins (Ol) $C_2$–$C_8$.

9. The fluoroelastomer according to claim 8, wherein the base monomeric structure is selected from (% by moles): (a) VDF 45–85%, HFP 15–45%, TFE 0–30%; (b) VDF 50–80%, PAVE 5–50%, TFE 0–20%; (c) VDF 20–30%, Ol 10–30%, HFP and/or PAVE 18–27%, TFE 10–30%.

10. The fluoroelastomer according to claim 1, wherein the monomeric structure is based on tetrafluoroethylene (TFE) copolymerized with at least a comonomer selected from: (per)fluoroalkylvinylethers (PAVE) $CF_2=CFOR_f$, wherein $R_f$ is a (per)fluoroalkyl $C_1$–$C_6$; perfluoro-oxyalkylvinylethers $CF_2=CFOX$, wherein X is a perfluoro-oxyalkyl $C_1$–$C_{12}$ having one or more ether groups; fluoroolefins $C_2$–$C_8$ containing hydrogen and/or chlorine and/or bromine and/or iodine atoms; non-fluorinated olefins (Ol) $C_2$–$C_8$.

11. The fluoroelastomer according to claim 10, wherein the base monomeric structure is selected from (% by moles): (d) TFE 50–80%, PAVE 20–50%; (e) TFE 45–65%, Ol 20–55%, 0–30% VDF; (f) TFE 32–60%, Ol 10–40%, PAVE 20–40%; (g) TFE 33–75%, 15–45% PAVE, 10–22% VDF.

12. A fluoroelastomer vulcanizable by ionic and/or peroxidic systems comprising between about 0.01 and 1.0 moles of monomeric units derived from a bis-olefin per 100 moles of other base monomeric units, with the monomeric units derived from a bis-olefin having the formula:

$$R_1R_2C=C-Z-C=CR_5R_6 \quad (I)$$
$$\phantom{R_1R_2C=C}|\phantom{-Z-}|$$
$$\phantom{R_1R_2C=C}R_3\phantom{-Z-}R_4$$

wherein:

$R_1$, $R_2$, $R_3$, $R_4$, $R_5$, $R_6$, equal or different from each other, are H or $C_1$–$C_5$ alkyl groups; Z is selected from the group consisting of $C_1$–$C_{18}$ linear or branched at least partially fluorinated alkylene or cycloalkylene;

$C_1$–$C_{18}$ alkylene or cycloalkylene containing oxygen atoms, optionally at least partially fluorinated; cycloalkylene; and (per)fluoropolyoxyalkylene.

13. The fluoroelastomer according to claim 12, wherein Z is an alkylene or oxyalkylene radical $C_1$–$C_{10}$, at least partially fluorinated.

14. The fluoroelastomer according to claim 12, wherein Z is a perfluoroalkylene radical $C_4$–$C_{12}$.

15. The fluoroelastomer according to claim 12, wherein Z is a (per) fluoropolyoxyalkylene radical of formula II:

$$-(Q)_p-CF_2O-(CF_2CF_2O)_m(CF_2O)_n-CF_2-(Q)_p- \quad (II)$$

wherein: Q is an alkylene or oxyalkylene radical $C_1$–$C_{10}$; p is 0 or 1; m and n are integers such that the m/n ratio is comprised between 0.2 and 5 and the molecular weight of said (per) fluoropolyoxyalkylene radical is comprised between 500 and 10,000.

16. The fluoroelastomer according to claim 15, wherein Q is selected from: $-CH_2OCH_2-$; $CH_2O(CH_2CH_2O)_sCH_2-$ wherein s=1–3.

17. The fluoroelastomer according to claims 12, 13, 14, 15 or 16, wherein $R_1$, $R_2$, $R_3$, $R_4$, $R_5$, $R_6$ are hydrogen.

18. The fluoroelastomer according to claim 12, wherein the amount of monomeric units derived from the bis-olefin is comprised between 0.03 and 0.5 moles per 100 moles of the other base monomeric units.

19. The fluoroelastomer according to claim 12, wherein the monomeric structure is based on vinylidene fluoride (VDF) copolymerized with at least a comonomer selected from the group consisting of: perfluoroolefins $C_2$–$C_8$; chloro-and/or bromo and/or iodo-fluoroolefins $C_2$–$C_8$, perfluoroalkylvinylethers (PAVE) $CF_2$=$CFOR_f$, wherein $R_f$ is a (per)fluoroalkyl $C_1$–$C_6$; perfluoro-oxyalkylvinylethers $CF_2$=$CFOX$, wherein X is a perfluoro-oxyalkyl $C_1$–$C_{12}$ having one or more ether groups; non fluorinated olefins (OI) $C_2$–$C_8$.

20. The fluoroelastomer according to claim 19, wherein the base monomeric structure is selected from (% by moles): (a) VDF 45–85%, HFP 15–45%, TFE 0–30%; (b) VDF 50–80%, PAVE 5–50%, TFE 0–20%; (c) VDF 20–30%, OI 10–30%, HFP and/or PAVE 18–27%, TFE 10–30%.

21. The fluoroelastomer according to claim 12, wherein the monomeric structure is based on tetrafluoroethylene (TFE) copolymerized with at least a comonomer selected from the group consisting of (per)fluoroalkylvinylethers (PAVE) $CF_2$=$CFOR_f$, wherein $R_f$ is a (per)fluoroalkyl $C_1$–$C_6$; perfluoro-oxyalkylvinylethers $CF_2$=$CFOX$, wherein X is a perfluorooxyalkyl $C_1$–$C_{12}$ having one or more ether groups; fluoroolefins $C_2$–$C_8$ containing hydrogen and/or chlorine and/or bromine and/or iodine atoms; non-fluorinated olefins (OI) $C_2$–$C_8$.

22. The fluoroelastomer according to claim 21, wherein the base monomeric structure is selected from (% by moles): (d) TFE 50–80%, PAVE 20–50%; (e) TFE 45–65%, OI 20–55%, 0–30% VDF; (f) TFE 32–60%, OI 10–40%, PAVE 20–40%; (g) TFE 33–75%, 15–45% PAVE, 10–22% VDF.

* * * * *